US006983270B2

(12) United States Patent
Rippich

(10) Patent No.: US 6,983,270 B2
(45) Date of Patent: Jan. 3, 2006

(54) METHOD AND APPARATUS FOR DISPLAYING DATABASE SEARCH RESULTS

(76) Inventor: Andreas Rippich, Flurstr. 2, 82110 Germering (DE)

( * ) Notice: Subject to any disclaimer, the term of this patent is extended or adjusted under 35 U.S.C. 154(b) by 194 days.

(21) Appl. No.: 09/768,727

(22) Filed: Jan. 24, 2001

(65) Prior Publication Data

US 2002/0099701 A1 Jul. 25, 2002

(51) Int. Cl.
G06F 17/30 (2006.01)
(52) U.S. Cl. .......................................................... 707/3
(58) Field of Classification Search ..............................
707/1–10, 100–104.1;
345/810–812, 826
See application file for complete search history.

(56) References Cited

U.S. PATENT DOCUMENTS

| 5,537,586 | A |   | 7/1996  | Amram et al.      |       |
|-----------|---|---|---------|-------------------|-------|
| 5,682,525 | A |   | 10/1997 | Bouve et al.      |       |
| 5,905,982 | A | * | 5/1999  | Carey et al.      | 707/4 |
| 5,924,090 | A |   | 7/1999  | Krellenstein      |       |
| 5,963,938 | A | * | 10/1999 | Wilson et al.     | 707/4 |
| 5,987,457 | A |   | 11/1999 | Ballard           |       |
| 5,995,979 | A |   | 11/1999 | Cochran           |       |
| 6,006,225 | A | * | 12/1999 | Bowman et al.     | 707/5 |
| 6,023,696 | A |   | 2/2000  | Osborn et al.     |       |
| 6,070,158 | A |   | 5/2000  | Kirsch et al.     |       |
| 6,088,692 | A |   | 7/2000  | Driscoll          |       |
| 6,105,035 | A |   | 8/2000  | Monge et al.      |       |
| 6,144,958 | A |   | 11/2000 | Ortega et al.     |       |
| 6,374,275 | B2| * | 4/2002  | Wasilewski        | 715/530 |

FOREIGN PATENT DOCUMENTS

WO          WO 00/54185          *    9/2000

OTHER PUBLICATIONS

Ginsberg ("A unified approach to automatic indexing and information retrieval", 1993, IEEE, pp. 46-56, vol. 8, Issue: 5).*

* cited by examiner

Primary Examiner—Mohammad Ali
Assistant Examiner—Joon Hwan Hwang
(74) Attorney, Agent, or Firm—Katten Muchin Rosenman LLP

(57) ABSTRACT

The invention relates to a method of displaying the progress of a database search so as to accomplish a logical operation that satisfies certain conditions; for example avoiding a null value. The invention also relates to an apparatus for practicing the method. The method displays all possible and relevant data capable of fulfilling the operation (like Boolean, SQL etc.) in addition to all possible and relevant operations (like Boolean, SQL etc.) to be applied on the given data. A key feature of the invention is that the displays occur during the operation. This is done by displaying all remaining possible and relevant data and/or operations directly after choosing a datum and/or the desired operation.

22 Claims, 16 Drawing Sheets

FIGURE 1a

| word list | Operator | | chosen terms | document list |
|---|---|---|---|---|
| bird | AND | | cat | test1.doc |
| cat | NOT | => | | test2.doc |
| dog | OR | | | test3.doc |
| horse | EXCL. OR | | | test4.doc |
| snake | | | | |

FIGURE 1b

| word list | operator | | Chosen terms | document list |
|---|---|---|---|---|
| cat | AND | | Cat | test1.doc |
| dog | NOT | => | Cat | test2.doc |
| horse | OR | | | test3.doc |
| | EXCL. OR | | | test4.doc |

FIGURE 1c

| word list | operator | | Chosen terms | document list |
|---|---|---|---|---|
| cat | AND | | Cat | test2.doc |
| dog | NOT | => | Dog | |
| horse | OR | | | |
| | EXCL. OR | | | |

FIGURE 2a

| Name | size | frequency | Price |
|---|---|---|---|
| M-15-70 | 15 | 70 | 210 |
| M-15-85 | 15 | 85 | 290 |
| M-17-72 | 17 | 72 | 320 |
| M-17-96 | 17 | 96 | 380 |
| M-19-90 | 19 | 90 | 450 |
| M-19-115 | 19 | 115 | 510 |
| M-21-110 | 21 | 110 | 820 |
| M-21-135 | 21 | 135 | 910 |

FIGURE 2b

| name | size | Frequency | Price |
|---|---|---|---|
| M-15-70 | 15 | 70 | 210 |
| M-15-85 | 15 | 85 | 290 |
| M-17-72 | 17 | 72 | 320 |
| M-17-96 | 17 | 96 | 380 |
| M-19-90 | 19 | 90 | 450 |
| M-19-115 | 19 | 115 | 510 |
| M-21-110 | 21 | 110 | 820 |
| M-21-135 | 21 | 135 | 910 |

FIGURE 2c

| name | size | frequency | Price |
|---|---|---|---|
| M-17-72 | 17 | 72 | 320 |
| M-17-96 | 17 | 96 | 380 |
| M-19-90 | 19 | 90 | 450 |
| M-19-115 | 19 | 115 | 510 |
| M-21-110 | 21 | 110 | 820 |
| M-21-135 | 21 | 135 | 910 |

FIGURE 2d

| name | size | frequency | price |
|---|---|---|---|
| M-17-72 | 17 | 72 | 320 |
| M-19-90 | 19 | 90 | 450 |
| M-17-96 | 17 | 96 | 380 |
| M-21-110 | 21 | 110 | 820 |
| M-19-115 | 19 | 115 | 510 |
| M-21-135 | 21 | 135 | 910 |

FIGURE 2e

| Name | size | frequency | Price |
|---|---|---|---|
| M-17-96 | 17 | 96 | 380 |
| M-21-110 | 21 | 110 | 820 |
| M-19-115 | 19 | 115 | 510 |
| M-21-135 | 21 | 135 | 910 |

FIGURE 2f

| name | size | frequency | Price |
|---|---|---|---|
| M-17-96 | 17 | 96 | 380 |
| M-19-115 | 19 | 115 | 510 |
| M-21-110 | 21 | 110 | 820 |
| M-21-135 | 21 | 135 | 910 |

FIGURE 2g

| name | size | frequency | Price |
|---|---|---|---|
| M-17-96 | 17 | 96 | 380 |

| main category | first sub-category |
|---|---|
| Picture of a film reel | picture of a teddy bear |
| picture of a computer | picture of toys like shovel and basket |
| picture of a toy | picture of toy cars like matchbox |
| picture of a book | picture of a model train |
| picture of a washing machine | picture of comic figures |

| operation |
|---|
| AND |
| NOT |
| OR |
| EXCLUSIVE OR |

| chosen terms |
|---|
| toy |

FIGURE 3c

| main category | first sub-category | second sub category | third sub-category | operation | chosen terms |
|---|---|---|---|---|---|
| Picture of a film reel | picture of a teddy bear | picture of Walt Disney's characters | picture of Mickey Mouse | AND | toy -> comic figures -> Walt Disney |
| picture of a toy | picture of sand toys like shovel and basket | picture of Japanese Manga comics | picture of Donald | NOT | |
| picture of a book | picture of toy cars like matchbox | picture of Pokémons | picture of Uncle Scrooge | OR | |
| picture of a magazine | picture of a model train | | picture of Pluto | EXCLUSIVE OR | |
| | picture of comic figures | | picture of Minnie Mouse | | |

FIGURE 3d

| main category | first sub-category | second sub category | third sub-category | operation within main category | chosen terms |
|---|---|---|---|---|---|
| Picture of a film reel | picture of a teddy bear | picture of Walt Disney's characters | picture of Mickey Mouse | AND | (toy -> comic figures -> Walt Disney) AND (toy) |
| picture of a toy | picture of sand toys like shovel and basket | picture of Japanese Manga comics | picture of Donald | NOT | |
| picture of a book | picture of toy cars like matchbox | picture of Pokémons | picture of Uncle Scrooge | OR | |
| picture of a magazine | picture of a model train | | picture of Pluto | EXCLUSIVE OR | |
| | picture of comic figures | | picture of Minnie Mouse | | |

FIGURE 3e

| main category | first sub-category | second sub-category | third sub-category | operation | chosen terms |
|---|---|---|---|---|---|
| Picture of a film reel | picture of a teddy bear | picture of Walt Disney's characters | picture of Mickey Mouse | AND | (toy -> comic figures -> Walt Disney->Uncle Scrooge) AND (movie) |
| picture of a toy | picture of sand toys like shovel and basket | picture of Japanese Manga comics | picture of Donald | NOT | |
| picture of a book | picture of toy cars like matchbox | picture of Pokémons | picture of Uncle Scrooge | OR | |
| picture of a magazine | picture of a model train | | picture of Pluto | EXCLUSIVE OR | |
| | picture of comic figures | | picture of Minnie Mouse | | |

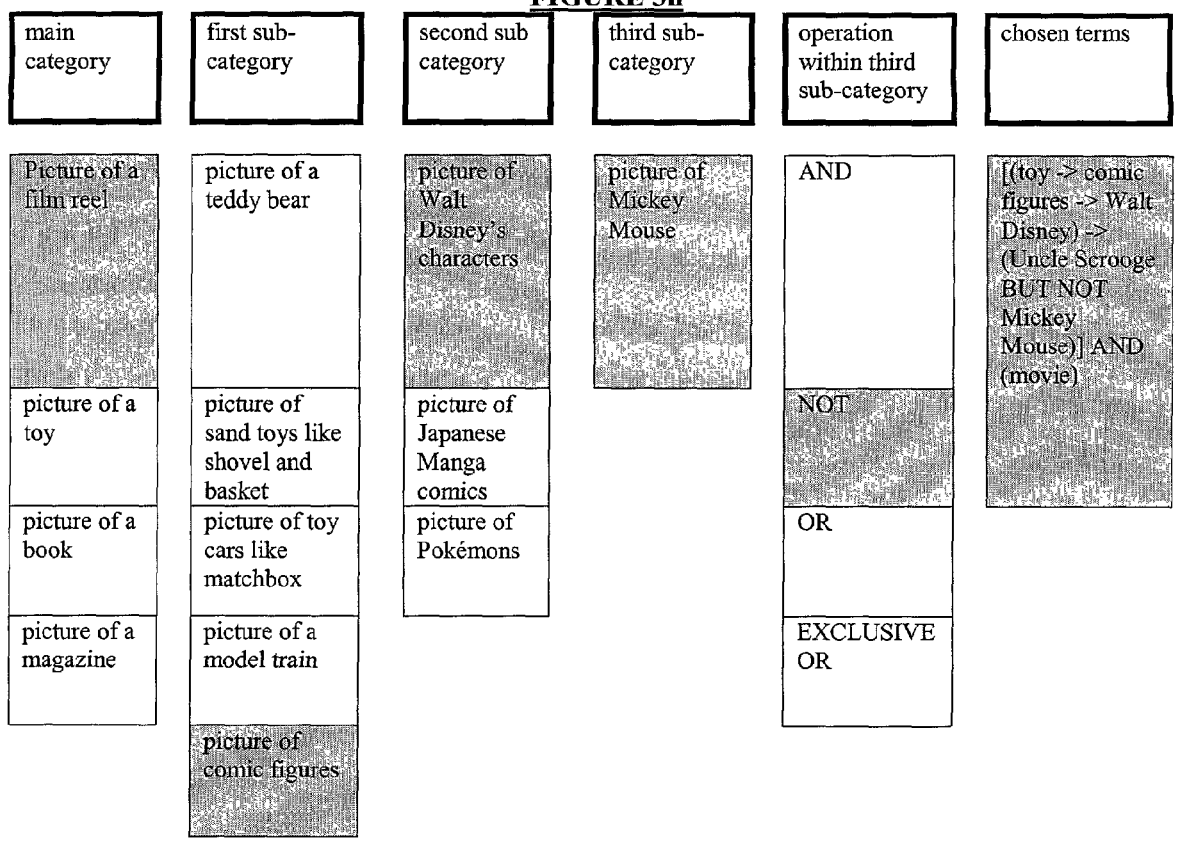

FIGURE 3i

| main category | first sub-category |
|---|---|
| Picture of a film reel | picture of a VHS-Video-cassette |
| picture of a toy | picture of a Video8/Hi8-cassette |
| picture of a book | picture of a DVD-ROM |
| picture of a magazine | |

| operation | chosen terms |
|---|---|
| AND | (toy-> comic figures -> Walt Disney -> (Uncle Scrooge BUT NOT Mickey Mouse)) and (movie) |
| NOT | |
| OR | |
| EXCLUSIVE OR | |

FIGURE 4a

| word | operator | result | history |
|---|---|---|---|
| flavour | | | |
| onion | | | |
| paprika | | | |
| pork | | | |
| potato | | | |
| salt | | | |
| tomato | | | |
| water | | | |

FIGURE 4b

| word | operator | result | history |
|---|---|---|---|
| flavour | AND | soup 2 | onion |
| onion | NOT | soup 3 | |
| paprika | OR | | |
| pork | EXCL. OR | | |
| potato | | | |
| salt | | | |
| tomato | | | |
| water | | | |

FIGURE 4c

| word | operator | result | history |
|---|---|---|---|
| flavour | AND | soup 2 | onion |
| pork | NOT | soup 3 | but not |
| | OR | | |
| | EXCL. OR | | |

FIGURE 4d

| word | operator | result | history |
|---|---|---|---|
| flavour | AND | soup 2 | onion |
| pork | OR | | but not |
| | | | pork |

FIGURE 5a

| PLANET | MASS | INSTANCE | DIAMETER |
|---|---|---|---|
| Mercury | 0.037 | 57.85 | 4,800 |
| Venus | 0.826 | 108.10 | 12,200 |
| Earth | 1.000 | 149.45 | 12,757 |
| Mars | 0.108 | 227.72 | 6,800 |
| Jupiter | 318.4 | 777.6 | 142,700 |
| Saturn | 95.2 | 1,425.6 | 120,800 |
| Uranus | 14.6 | 2,668.1 | 49,700 |
| Neptune | 17.3 | 4,494.1 | 53,000 |
| Pluto | 0.8 | 5,905.9 | 5,000 | mass = mass relative to the mass of the Earth
distance = medium distance from the Sun in million km
diameter = average diameter in km

FIGURE 5b

| available operations |
|---|
| planets heavier than Earth |
| planets lighter than Earth |
| planets farther away from the Sun than Earth |
| planets nearer to the Sun than Earth |
| planets larger than Earth |
| planets smaller than Earth |

| planet |
|---|
| Mercury |
| Venus |
| Earth |
| Mars |
| Jupiter |
| Saturn |
| Uranus |
| Neptune |
| Pluto |

FIGURE 5c

| available operations |
|---|
| planets heavier than Earth |
| planets lighter than Earth |
| planets farther away from the Sun than Earth |
| planets nearer to the Sun than Earth |
| planets larger than Earth |
| planets smaller than Earth |

FIGURE 5d

| available operations |
|---|
| planets lighter than Earth |
| planets smaller than Earth |

| planet |
|---|
| Mercury |
| Venus |

METHOD AND APPARATUS FOR DISPLAYING DATABASE SEARCH RESULTS

FIELD OF THE INVENTION

The invention relates to displaying the progress and results of database searches.

BACKGROUND

U.S. Pat. No. 5,924,090 discloses a method and apparatus for searching databases by organizing the data contained therein into categories and sub-categories, or lists, such as entry lists or value lists. This invention uses a complex categorization or clustering methodology to first generate a search result list, and then to cluster the results into relevant categories. The clustering step itself involves a complex series of processes, such as: (1) generating a list of candidate categories based on matching subject type, source and language characteristics of the query and result lists; (2) weighting each candidate category as a function of the identified common characteristics of the records within the candidate category; and (3) graphically displaying a subset of said categories.

The process described in U.S. Pat. No. 5,924,090 is complex and does not provide a mechanism to avoid null results. Further, it employs a grouping processor to perform the clustering functions. There is no teaching as to how to avoid null responses. Nor is there any teaching that discloses how to reach the instant invention by relying on text-retrieval software that does not require the correlating and weighting of search categories. Nor does this reference allow the user to follow the progress of the various search steps by displaying the steps on the monitor. The importance of this to the instant invention will become clear in the examples provided below.

The method described in U.S. Pat. No. 5,537,586 employs a different method to extract preferred sets of records from a database. This method employs assignments of priority values to categories, and database entries are in turn, prioritized with respect to each category. The priority values assigned are a function of the user's history of searches. Thus, the relevance of the set of entries to a category, and the priority of the category itself undergo constant modification. Subsets of entries are then displayed. This method does not teach displaying all relevant values that comprise search results to a particular query. Further, there is no teaching on the avoidance of a null result.

As described below, the invention is distinguishable from '586, because it does not employ hierarchies of relevance and priorities in displaying search results. Instead, the invention displays database entries, and in response to a search term or an operator, continuously updates the databases to display all possible entries that can positively fulfill the operation. In this way the user avoids null results.

Similarly, other searching methods have included complex steps for handling null values. U.S. Pat. No. 6,006,225 employs correlations between specific search terms and their frequency of appearance in a specific query, to suggest related terms to the user. These related terms are added to, and selected from a look-up table of query log files, thus guaranteeing that the modified queries will not produce a null result. Similarly, U.S. Pat. No. 5,905,982 employs correlations that are applied to various attributes to database categories in processing SQL queries. Neither of these references simplifies the search process by a simple editing of the available database. Nor do these references disclose the importance of a user visibly monitoring the search process in order to avoid the nullity.

Accordingly, there is a need in the art for a method of displaying the results of database searches so that it can be adapted for use with various kinds of databases that normally are organized categories and sub-categories. Further, another useful object of the invention is to provide a method for avoiding null results, that does not require the accrual of search histories but that functions as efficiently the first time, as it will on subsequent occasions. As stated above, this cannot be achieved by correlation and weighting software. The prior art methods rely upon users being repeat database searchers, thus developing a query history. Thus another object of this invention, is that the search is performed using a simple text-retrieval software program to choose entries, and eliminate irrelevant terms.

Another object of the invention is to describe a display apparatus capable of manipulating and displaying the updated entry lists or value lists to provide a user-friendly graphic interface for implementing the present invention.

SUMMARY OF THE INVENTION

The invention described herein relates to a method of displaying database search results so as to avoid obtaining null responses or—more generally—to avoid an unwanted result and to obtain a wanted result, when performing logical operations such as Boolean and SQL type searches, but other operations as fuzzy logic and phonetic search (e.g., using the soundex algorithm) are also possible. The present invention achieves this by continuously editing the available database responses, as well as possible search terms, and displaying updated database entries and operator choices. This simple approach obviates the possibility of creating a search query with no relevant response from the instantaneously edited database.

An object of the present invention is to provide a method of displaying the updated or edited database results in response to a submitted query term or operation term. Therefore, one object of the invention is to provide a method for visually displaying key elements of the search history, thus permitting the user to modify the search strategy if desirable. For example, depending upon whether the user seeks to avoid a null result, or seeks a null result. Examples of both are provided below.

The invention relates to searching databases by performing search queries within categories or lists wherein the lists or categories arise sequentially, and in increasing narrowness of possible responses. Another object of the invention is to permit the user to follow the entire search process by displaying the entire complement of categories and sub-categories or other entry grouping, chosen during a given search.

It is a desirable objective of this invention to allow a user to view all possible terms of a logical operation (like Boolean, SQL etc.) while the search operations are being performed. This is accomplished by displaying all remaining possible terms directly after choosing the first term and the desired operation. Terms may consist of words, pictures, movie-sequences, sound-sequences etc., as long as the concept can be displayed in some way—hierarchical orders are also possible.

A key feature of the inventive method disclosed and claimed herein, is the elimination from all lists, categories, etc., of all irrelevant and impossible responses. Therefore, it should be emphasized that an additional extremely desirable object of the invention is providing a method to search databases that avoids yielding null responses, such as "no documents found" or "no documents match your query," and the like. After a search query or click-choice is made, a conventional Boolean operator term is chosen, e.g. AND. At this point, the search method of the invention eliminates terms relating to choices and/or responses that are irrelevant or logically impossible in light of previous queries within the same search operation. The method thus requires an auditing step that audits or scans all possible response terms and eliminates the irrelevant and impossible responses. This response audit occurs automatically upon applying the operator term to the chosen category.

Null values are routinely encountered when the operator chosen is, e.g., AND, AND NOT, or EXCLUSIVE OR. The method of the invention avoids nullities in two ways.

1. All sub-categories or documents on a potential result list that do not include the chosen words' or symbols' concept, are eliminated from the category list. Only categories that may logically be combined with the chosen sub-category remain.
2. Second, all categories and sub-categories not within the scope or content of the remaining subcategories are eliminated from the list of potential responses.

BRIEF DESCRIPTION OF THE FIGURES

FIG. 1a–1c are illustrations of the inventive principle as applied to simple word searching to find relevant documents.

FIG. 2a–2b are illustrations of the inventive method as applied to searching an online database for a product, here a computer monitor, that possesses various attributes.

FIG. 3a–3j illustrates the application of the inventive method to searching a database that has been divided into subcategories, and uses pictures of entries rather than textual descriptions.

FIG. 4a–4d illustrates the application of the inventive method to searching and displaying options for a "meal item" such as a "soup" that conforms to specific tastes and dietary concerns.

FIG. 5a–5d illustrates the application of the inventive method to choosing planets according to various physical criteria.

DETAILED DESCRIPTION

Figure 3A:
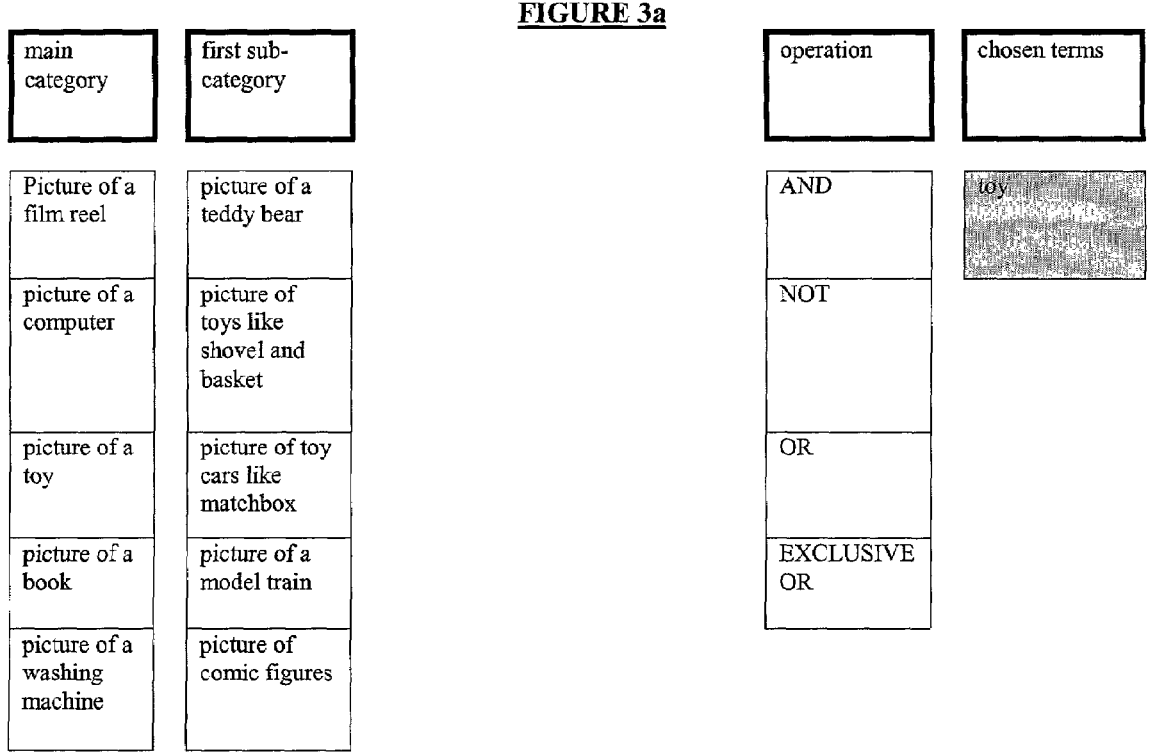

FIGS. 1a–1c illustrate the invention's application to searching a word list to obtain specific documents from a document database. In FIG. 1a, the word >>cat<< is the first chosen term of the operation and thus highlighted; it is contained only in the 4 documents displayed on the document list, even though there may be hundreds or thousands of documents in the database. No operator has been selected yet.

FIG. 1b shows the result after choosing the Boolean operator >>AND<<. The result of the operation is immediately visible:

A. Since the cursor in the word list has not yet been moved the word >>cat<< is still highlighted. Until another word is chosen from the word list "cat" is both the first term as well as the second. The operation >>cat AND cat<< results in the same 4 documents as before.
B. The words >>bird<< and >>snake<< have been automatically eliminated. This means that there is no single document containing both >>cat<< and >>bird<< or >>snake<<; thus a NULL value resulting from >>cat AND bird<<, or >>cat AND snake<<, is avoided.
C. There is at least one document which contains both >>cat<< and >>dog<< and at least one which contains both >>cat<< and >>horse<<.

We now refer to FIG. 1c.

D. If the cursor of the word list is moved from >>cat<< to >>dog<< then the result of the operation >>cat AND dog<< is apparent at once: the two words >>cat<< and >>dog<< are contained in the document >>test2.doc<< and only in this document.

FIG. 2a–2g also provide an example of a customer who wants to buy a monitor. Instead of Boolean command searching, the database is explored via SQL queries. At first, the customer has (for example by downloading from the internet) a table named >>monitor<< containing all monitors available from this on-line supplier, and he or she wants to select one model via SQL.

A SQL-statement ends with a semicolon; but instead of waiting for the whole phrase to be defined (with the possibility of a resulting null value) it is possible to present all remaining values whilst typing in the SQL-command:

SQL: >>SELECT * FROM monitor<<
result: As soon as the table >>monitor<< is being named the complete table is being displayed, as in FIG. 2a.
SQL: >>SELECT* FROM monitor WHERE ([size]<<
result: As soon as the row >>size<< is being named the table is ordered (ascending) by size as shown in FIG. 2b.
SQL: >>SELECT * FROM monitor WHERE ([size]>15)<<
result: After stating that only monitors greater than 15" are to be selected the two monitors >M-15-70<< and >M-15-85<<, are deleted from the list, size as shown in FIG. 2c.
SQL: >>SELECT* FROM monitor WHERE ([size]>15) AND ([frequency]<<
result: As soon as the row, >>frequency<<, is being named the table is ordered (ascending) by the values for the maximum horizontal frequency size as shown in FIG. 2d.
SQL: >>SELECT* FROM monitor WHERE ([size]>15) AND ([frequency]>90)<<
result: After stating that only monitors with a maximum horizontal frequency greater than 90 kHz are to be selected the two monitors >>M-17-72<<, and >>M-19-90<< are deleted from the list, as shown in FIG. 2e.
SQL: >>SELECT * FROM monitor WHERE ([size]>15) AND ([frequency]>90) AND ([price]<<
result: As soon as the row >>price<<, is being named the table is ordered (ascending) by the price in U.S. dollars, as shown in FIG. 2f.
SQL: >>SELECT * FROM monitor WHERE ([size]>15) AND ([frequency]>90) AND ([price]<400);<<
result: After stating that only monitors that cost less than 400 US$ are to be selected the three monitors >>M-19-115<< >>M-21-110<< and >>M-21-135, are deleted from the list, so that only one single monitor named >>M-17-96<<, remains as the final result, as shown in FIG. 2g.

Other logical operations are applicable in addition to Boolean or SQL-operations; e.g., fuzzy logic, phonetic search using the soundex algorithm. Any logical operator which can combine simple operators into more complex operations are contemplated as being within the scope of the present invention.

A null value is avoided because the possible values are immediately visible; thus it is apparent that the lowest price is 380 US$ which would make a price below that value absurd since it would cause a null value; but by asking for a price less than 400 US$ exactly one monitor is selected whose data are presented after completing the SQL-query by a semicolon.

An Example Using Pictures as Well as Sub-categories

It is not necessary to limit the entries in the list boxes to regular words or phrases—literally everything can be included in the patent such as words, pictures, videos, sounds, etc., as long as the concept can be displayed in some way—hierarchical orders are also possible. This shall be demonstrated with an example of an internet shopping center especially designed for customers who either cannot read (analphabetics or children) or who visit the site from all over the world making it difficult to provide every wanted language. So in this special case the displayed items are not words but pictures of concepts which can easily be understood by everyone.

In the example shown in FIG. 3a, a customer wants to buy a gift for his child. Thus he chooses a toy (or in this case a picture of a toy) from the various items of the main category. Because the categories are not represented as written words but as pictures the user may let his child participate in the search. Similarly, other users not able to read a particular language, may still search the database.

Figure 3B:
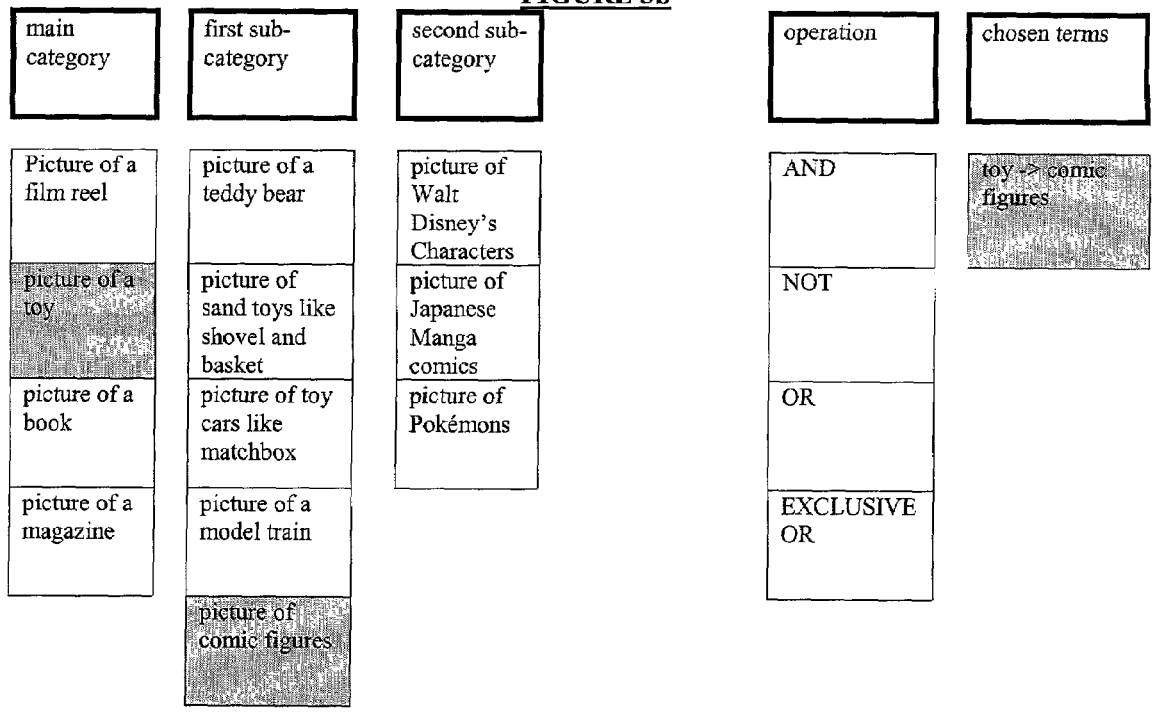

After choosing a picture of a toy a sub-category pops up and flashes asking for a selection of the kind of toy the child wants:

By scrolling through the list the child points to the picture of comic figures, thus choosing this item; and together with this choice a second sub-category appears asking for the kind of comics wanted. These results are shown in FIG. 3b.

The chosen terms are now >>toy→comic figures<<.

Selecting Walt Disney brings up a third sub-directory presenting all of its available figures. The chosen terms are now >>toy→comic figures→Walt Disney<<, as shown in FIG. 3c.

In the search in FIG. 3d, before a choice of the desired Disney characters can be made, it must be decided which medium (book, movie, magazine, etc.) is preferred. There are several possible arrangements by which choices of medium entries may be displayed on the screen. For example, the medium can be part of the main category, or it can be displayed as another subcategory. In FIG. 3d, the main category list provides these choices. To signal the appropriate step in the search sequence at which this choice is made, the available relevant medium entries shall blink. Alternatively, the displayed entries may change their color, or otherwise visibly indicate the when and where the required selection must be made. In FIG. 3d, the user needs to choose an operation for a second term of the main list.

Since it already has been decided that a some sort of Walt Disney comic figure is wanted all items not related to these comic figures are deleted from the main list. Only a film reel, a book and a magazine can be chosen as the user's medium of choice.

After choosing the AND-operator the cursor of the main category is still positioned on the picture of a toy, so the accomplished operation is ((toy→comic figures→Walt Disney) AND toy) showing no immediate result.

As soon as the picture of a film reel is chosen in FIG. 3e, it becomes clear that a movie is desired. So the third sub-category listing all figures playing in any Walt-Disney comic movie is now accessible and blinks awaiting input. Since the Boolean operation is over the symbol for the AND is no longer highlighted: the chosen terms are now >>(toy→comic figures→Walt Disney) AND (movie)<<.

Figure 3F:
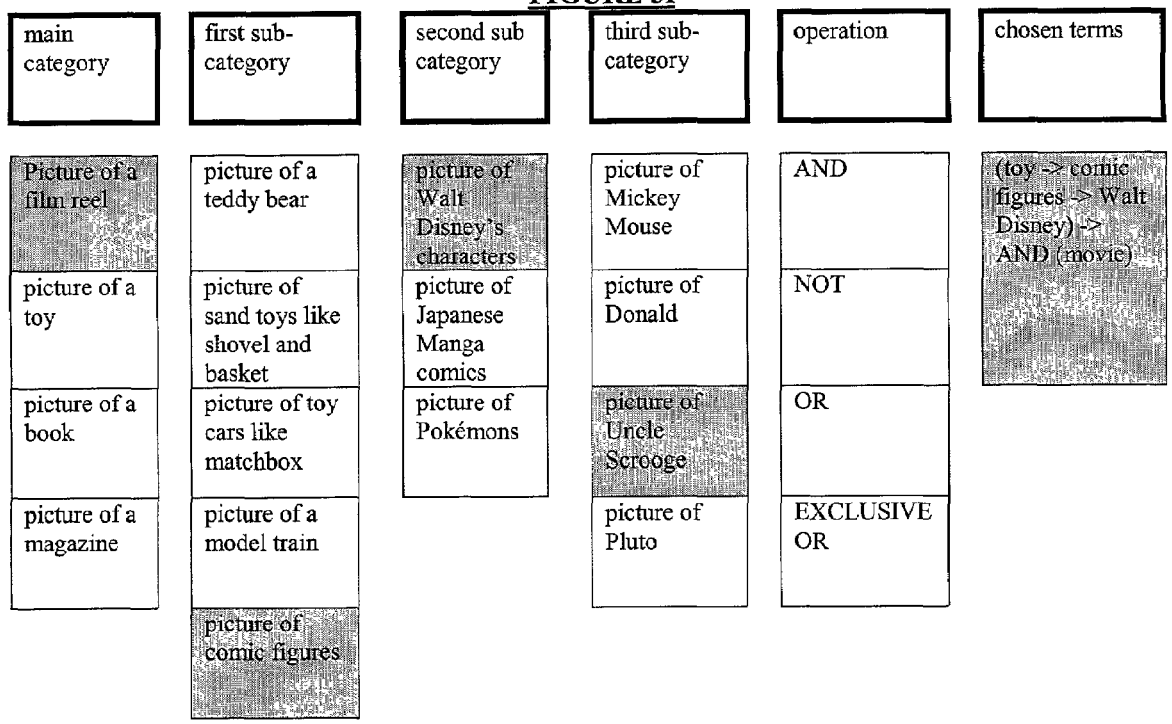

Further editing of the database entries is illustrated in FIG. 3f. As soon as Uncle Scrooge is selected the picture of Minnie Mouse disappears indicating that there is no single movie showing Uncle Scrooge together with Minnie Mouse. This makes a null result from a search for a movie with Minnie and Scrooge impossible, because the query cannot be made: the chosen terms are now >>(toy>comic figures→Walt Disney→Uncle Scrooge) AND (movie)<<.

Figure 3G:
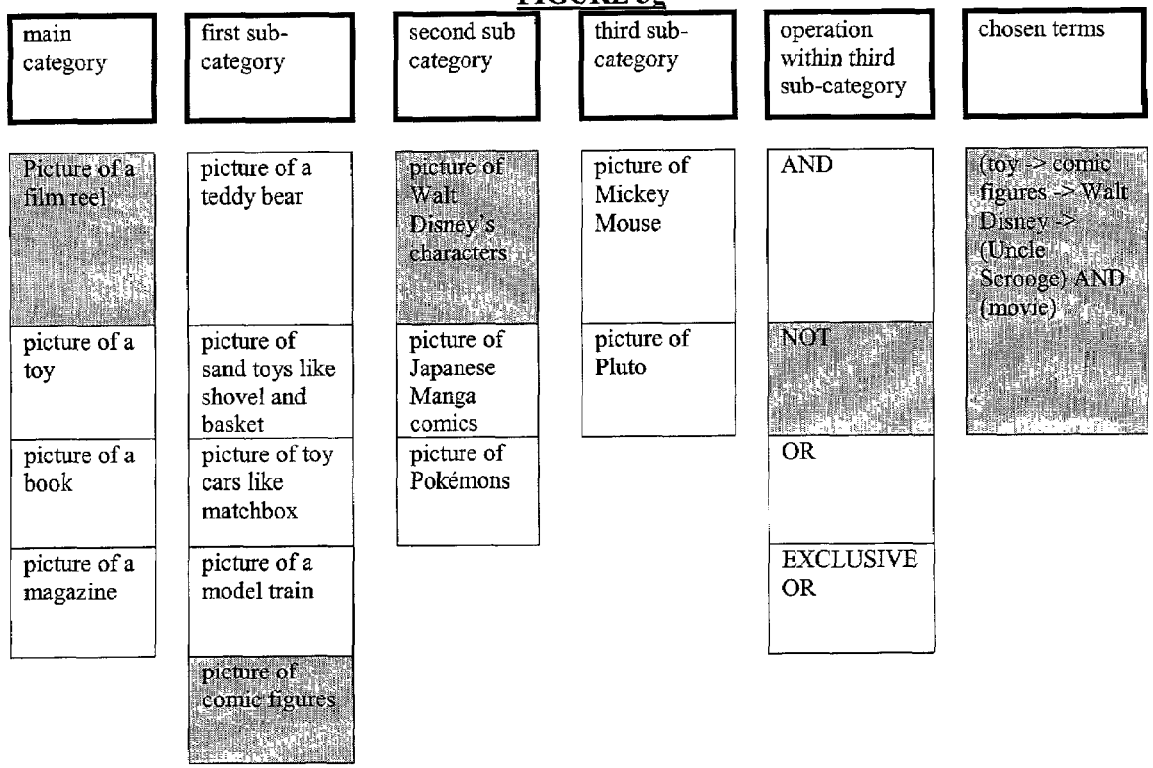

Now the user might be prompted to choose a logical operator which in this case refers not to the main category but to the third sub-category indicating that the comic figures should be selected. After choosing the NOT operator in FIG. 3g, the previously chosen figure of Uncle Scrooge disappears since it obviously is not possible that he at the same time appears in a movie and not appears in a movie.

And the picture of Donald also disappears which demonstrates that in any movie with Uncle Scrooge his nephew Donald also appears. Then the third sub-category blinks or otherwise signals that a selection is needed.

Now Mickey Mouse might be selected indicating that he is not to appear in the movie (FIG. 3h). There are many ways to continue with the logic; one possible solution might result in the picture of Pluto also being deleted from the list; this would indicate that no single movie exists which shows Uncle Scrooge together with Pluto but without Mickey Mouse. The chosen terms are now >>(toy→comic figures >Walt Disney→Uncle Scrooge BUT NOT Mickey Mouse) AND (movie)<<.

Figure 3J:
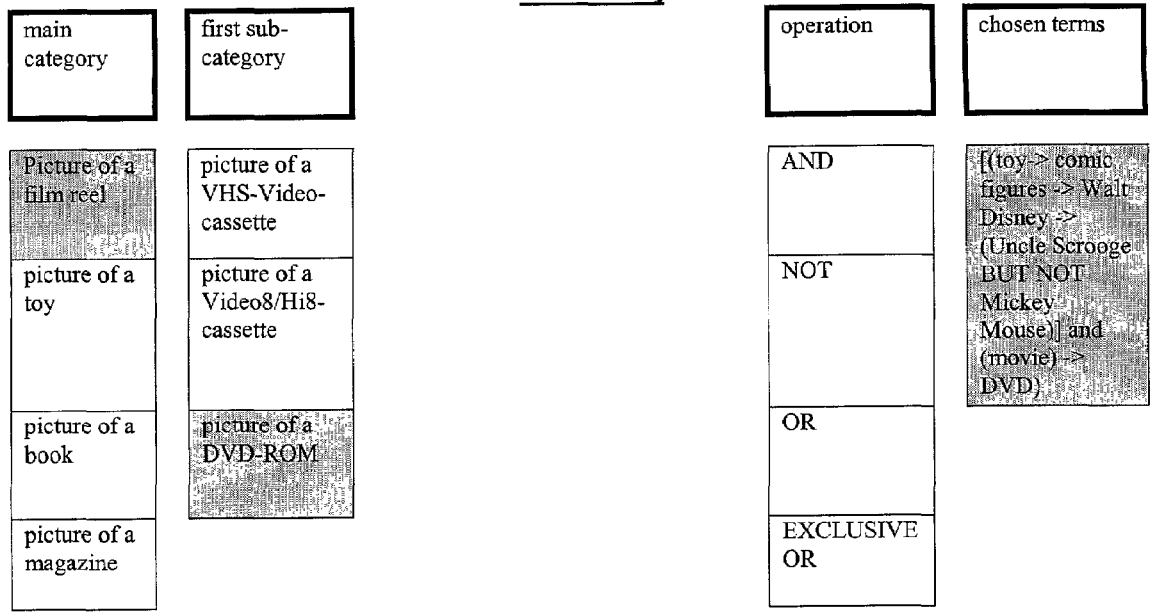

If the logic is as shown above the search might be over since one single movie has been selected. As shown in FIGS. 3i and 3j, the sub-categories as they had been up to now are obsolete and thus replaced by a new first sub-category asking for the medium of the movie (video, DVD etc). Choosing DVD as the movie format ends the query.

The method and apparatus described herein may be applied to various types of database searches. Although this invention has been described in terms of certain preferred embodiments, other embodiments that are apparent to those with ordinary skill in the art are also within the scope of the claimed invention.

Example for Avoiding Null Values in a a NOT-operation by Displaying all Relevant Data Fulfilling the Operation During the Operation Itself:

The example shown in FIGS. 4a–4d is based on the following three illustrative documents that are not shown in FIG. 4:

file "soup 1.doc" contains the ingredients of soup no. 1 and reads "tomatoes, water, paprika, salt, and flavours"

file "soup 2.doc" contains the ingredients of soup no. 2 and reads "tomatoes, onions, potatoes, water, salt, and flavours";

file "soup 3.doc" contains the ingredients of soup no. 3 and reads "tomatoes, onions, potatoes, water, pork, and salt".

All words contained in the three documents are listed in the word-list with the following conditions:

a) they are usually ordered alphabetically;
b) they are usually presented in their "normal-form" like nominative singular for nouns, or infinitive for verbs, respectively. This means that if in case of a different example the words "mouse" and "mice" would both be relevant for the word-list only the word "mouse" would be shown: if the user should select the word "mouse" from the word-list, another list not shown in this example might pop up showing the two entries "mouse" and "mice";

c) usually only relevant words and operations are being listed. In this example the word "and" is contained in the documents, but since it bears no information for the user it is being suppressed.

No word has been selected yet in FIG. 4a.

If the soup should contain onions, the word "onion" is chosen. Thus follows; since soup 1 does not contain onions, it does not show up the result-list in in FIG. 4b. The result list shows soup 2 and soup 3, which means that they and only they contain onions.

The operator-list is updated to display the operators "AND", "NOT", "OR" and "EXCL. OR", as the word "onion" when combined with any one of these four operators would produce at least one result for the result-list.

So far everything is temporary and the user can still change his mind and move the focus from "onions" to another item; when scrolling through the word-list the values in the operator-list and in the result-list and the entry in the history-list would change correspondingly and more or less simultaneously; since everything is only temporary the word list still contains all words including those from the file "soup 1".

If the user were to choose "tomato" instead of "onion", the operator "EXCL. OR" would have to be taken off the operator-list. Since each soup contains tomatoes, there would be no result fulfilling the operation "tomato EXCL. OR. . . .".

As soon as the user is sure that it is onions he wants to he fixes the word "onion" as the first datum of the operation.

After having chosen "onions" the user decides that the soup should contain onions, but no pork, and therefore selects the operator "NOT".

This makes it possible to update the word-list as shown in FIG. 4c:

the word "paprika" is eliminated because it is contained neither in "soup 2" nor in "soup 3";

the words "onion", "potato", "salt", "tomato", and "water" are eliminated because they are present in "soup 2" and "soup 3", and are therefore incapable of satisfying the "NOT" condition Accordingly, only the words "flavour" and "pork" are left.

If for example "water" would not be taken off the word-list, null values could occur; this would be the case if the user would select "onion NOT water", since each soup containing onions also contains water.

So far only the first datum of the operation is fixed; the operator itself is still temporary and the user may change his mind and move the focus from "NOT" to another operator. When scrolling through the operator-list the entries in the word-list and the history-list would change correspondingly and more or less simultaneously.

As soon as the user is sure that it is the operator "NOT" that is wanted, he/she fixes it as the first operator of the operation.

So far, a word and an operator have been chosen. Now another word is needed to complete the operation. As it is decided that the soup should not contain "pork", "pork" is selected in the word-list as shown in FIG. 4d.

"Soup 3" must be omitted from the result-list because it contains pork, so "soup 2" becomes the only entry in the result-list because it is the only result containing "onions" but no "pork".

The operators "NOT" and "EXCL. OR" must be omitted from the operator-list because there is no word in the word-list that can fulfill the operation "(onions NOT pork) NOT . . . " or "(onions NOT pork) EXCL. OR . . . ".

At this point, as a word has not be fixed, the user may scroll from "pork" to "flavour". When he/she scrolls through the word-list, the values in the operator-list, the result-list and history-list will change correspondingly and simultaneously.

As soon as the user fixes the word "pork", a single result ("soup 2") is obtained and the query is essentially over. It would be possible to continue with the operators "AND or "OR", but this would not make much sense as the result "soup 2" would not change.

Since all unfitting items were omitted from the word-list the moment the operator (in this example "NOT") was chosen it is ensured that null values cannot occur regardless of which item the user should choose as the second word (in this example "pork"). As a result, there will always be at least be one document in the result-list.

So in a certain sense the operation is never permanently fixed since the result is shown in the result list while the user is still scrolling through the word list choosing his second datum. If desired the operation can be defined as fixed by clicking on an OK-button.

The operation reads "onion NOT pork" and is complete, because only one single document is left in the result-list. Even though it makes no sense to continue it is not forbidden to do so and to expand the operation for example to "(onion NOT pork) AND flavour" which would result in the same "soup 2". This would be accomplished by selecting the operator "AND" and then the word "flavour."

Usually an "undo"-button will be provided. The last user-interaction is generally temporary and can still be altered even though some or all results of the interaction are simultaneously visible; the last user-interaction also changes the status of the second-to-the-last user-interaction from temporary to permanent. Or, in other words, the locking of the n-th word/operation occurs by choosing the (n+1th) word/operation. The last interaction of the user in the word-list or in the operation-list usually causes changes in some or in all other lists in order to avoid unwanted results like null values.

Example for Avoiding Null Values by Displaying All Possible Operations Applicable on Given Data and by Omitting the Operations Resulting in a Null Value, and for Creating a Hybrid Search Team.

The following example is provided to show how the invention may be modified so as to not require standard search terms and operators, as in Boolean and SQL queries. FIGS. 5b–5d incorporate into the operator term criteria specifically relating to the entry list or value list in FIG. 5a. For the purpose of the invention, this may be considered a hybrid operator term because it possesses the nature of a standard search term, but also specifies an operation on that search term.

In a database (not necessarily visible to the user) the data of the planets of the solar system are stored, as for example, in FIG. 5a. Visible to the user, as in FIG. 5b, are the available operations and the names of the planets resulting from these operations:

If the operation "planets nearer to the sun than Earth" is chosen, the result shown in FIG. 5c is immediately visible:

1) Only two planets are nearer to the Sun than Earth: Mercury and Venus.

2) All planets nearer to the Sun than Earth are lighter than Earth and smaller than Earth, so all other previously available operations are no longer available.

Examples Where Matches Are to be Avoided and Null Values are Wanted.

In principle, users may use the invention to perform searches in which they seek to avoid obtaining a result, rather than those situations described above, wherein the user affirmatively seeks one or more positive results.

In cases where the user is creating a new document, e.g., a musical work, a null result may be an important aid in determining where a "void" in a particular field or art may occur.

It might be that a composer of film music wants to compose a new song but he has to take care that the music is unique in order to avoid conflicts with the copyrights of other composers of their music.

Thus there may be several values-lists: one may contain only single notes, one may contain single chords, one may contain different keys (c-major, g-minor etc.), one may contain different instruments (piano, flute, guitar, etc), and so on.

There may also be several operator-lists: the operators of one operator list may combine the selected items (single notes or short melody sequences) from the different values-list sequentially in order to form a single melody, and the operations of another operator list may combine several single melodies into complex music containing chords in order to represent an instrument like a piano, an organ, a guitar etc.), and the operators of a third operator list may combine the music of the different instruments to form an orchestral score.

Normally the result list should contain one or more items. But in this case it displays all composers whose copyright would be violated by the music composed so far, which means that the result list should be empty and should show only null values.

Thus updating of the values-lists and the operation lists must ensure that no matches occur between the composed music and the copyrights of other music. This means that after a few bars have been composed certain notes or chords may vanish from one of the values-lists because if they would be incorporated the resulting music might be too close to a protected film music. So the composer is always on the safe side because the program hinders him from accidentally encounter any copyrighted music; he will develop the tune into another direction and automatically avoid matches. After a few more bars the temporarily suppressed notes or chords may be made visible and accessible again because there is no more danger of violating the copyrights of said film music.

Other examples based on this principle could be a webdesigner who wants to create unique meta-tags to refer to his website; the above method would allow his avoidance of known terms. One may produce novel recipes lacking specific ingredients of existing recipes. One may choose to add an item such as a document or photograph, to an existing archive or database, but will search the database first to ensure that the added item is not a duplicate.

Additional Aspects and Embodiments of the Invention

Another embodiment of the method would contemplate performing a database search wherein an initialization step is followed by repeated applications of a search command. The initialization step may be as simple as choosing a first entry or value from an entry or value list. According to the invention all interim results as well as the final results, will be displayed. The search command would consist of an operator followed by any item from an entry list or value list. The operators themselves may be displayed in an operator list, or table format. Similarly, the results of the search would be displayed in tables, lists or other possibly ordered formats.

Choosing a value from one of the value lists would be displayed as an intermediate or temporary stage of the operation. When the next desired operator is chosen, the inventive method updates and displays the operator list and entry/value/result lists to prepare for another search step, if desired.

Figure 6:
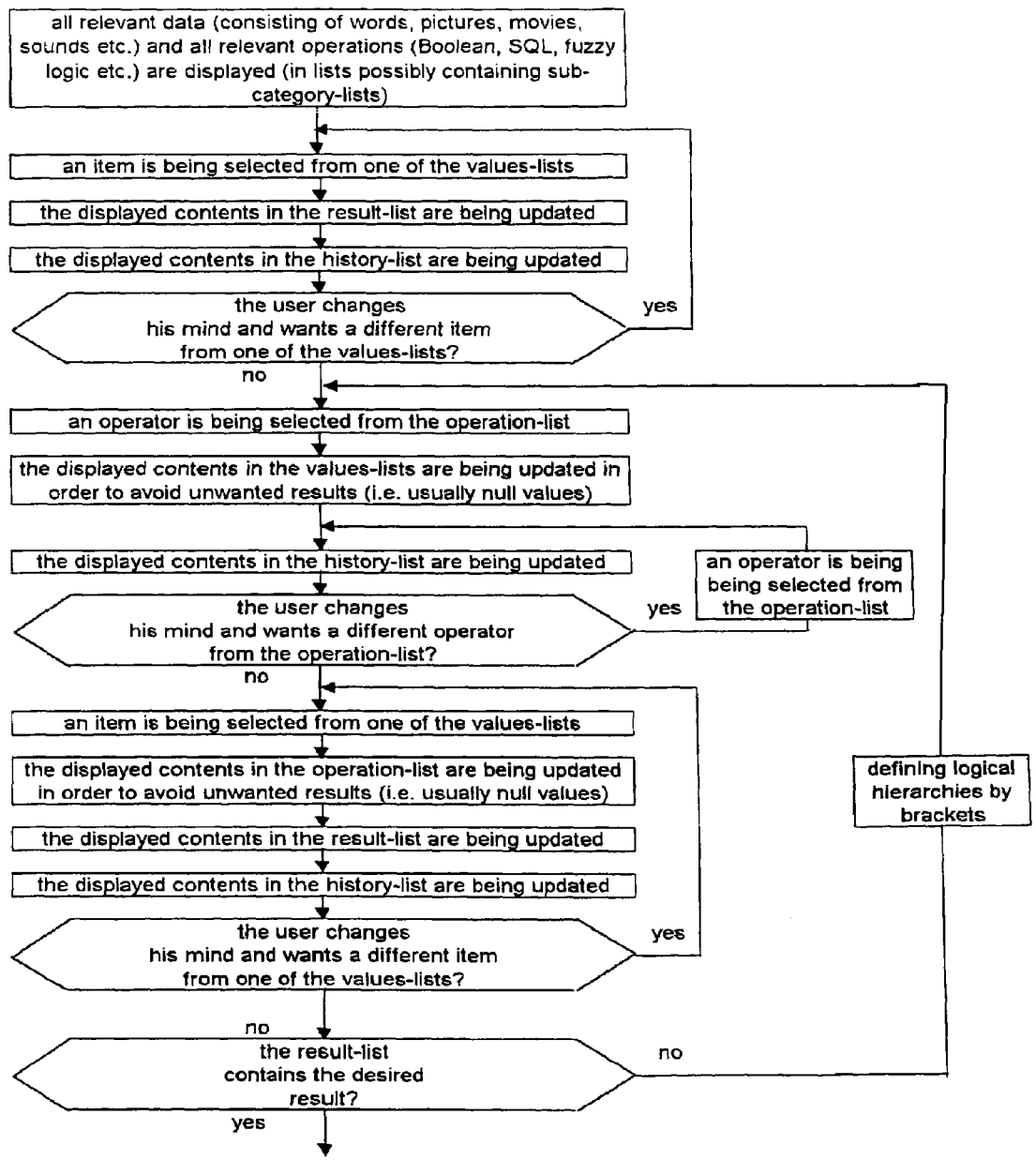
FIG. 6 is a block diagram illustrating the sequence of steps in the method of the present invention.

The method step referred to herein as "updating" encompasses, but is not limited to displaying only relevant entries/values/results capable of satisfying the entire search command. Unwanted and/or irrelevant values, for example those that might result in a null result list, are eliminated, or at least visibly suppressed. Further, an important element of the invention is to update operator lists, tables or other displayed formats in a similar manner. A key element of the invention is preventing the user from being able to create a search command producing unwanted results. Accordingly, the invention herein contemplates virtually any method of barring a user from entering such a command term. The possible interaction of the values-lists with an operator list can be seen in the flow chart, FIG. 6.

Various modifications of the above embodiments are immediately apparent. For example, items contained in the entry/value/result lists, tables, etc, may be text or words, but also various types of photos, pictures, drawings, designs or graphic representations. In some cases, these visible non-textual representations may be moving images as in movies or video segments, or perhaps animated cartoon-like segments. These stationary or moving images may be accompanied by sounds such as voice commands, music, or other conventional sound effects that may help identify a particular entry/value or category thereof. Such a series of modifications would be of great use for those unable to read, or to those who are foreign to the particular language, or those who are too visually impaired to read text at that resolution. Thus children, tourists or disabled may access the database and perform their tasks.

The inventive method herein also embodies providing for a result that is in a different category or concept than the entries/values used in formulating the search commands. A version of this conception is shown in the example of FIG. 4, wherein the final result 'soup' is very different from the ingredients listed in entries/values lists.

Another variation within the scope of the invention is demonstrated within the example of the movie score composer. In such an embodiment, the final composition can be viewed as a compilation of a plurality of result/entry/value lists.

The movie score composer example is also illustrative because it demonstrates the utility of actually seeking a nullity. Thus the invention is extremely versatile in that it manipulates the entry/value/result lists and the operator lists to either completely eliminate nullities, or alternatively makes them the desired result.

Another aspect of the method adaptable to virtually any of its embodiments, is that the method can be geared for convenience because its text retrieval format possesses various ordering capabilities. Thus, any entry/value/result display can be arranged alphabetically, or numerically. Further, such ordering can be in ascending or descending order. However, it is clear that an ordering function is not mandatory to use the invention. Indeed, embodiments based on entries/values/results comprising non-textual or audio or visual elements, may not be readily ordered. However, this is in no way an impediment to implementing many of the key elements of the inventive method.

One useful embodiment that employs the hierarchical ordering concept, is the grouping or clustering of entries/values/results into categories and subcategories, as in the example of FIG. 3.

The clustering into a category or sub-category may be achieved in various embodiments, by replacing conventional lists and tables with two dimensional or apparently three dimensional formats. Thus for example, a user could conceivably need to pick one or more colors to complement his search; e.g., a color of a shirt, or a computer monitor, or wall paper, all of which are easily purchased on-line. The colors may be displayed on a representation of a painter's palette. For example, clicking on a paint smear red paint, would enter "red" as part of the search command, just as if the word "red" were clicked on a conventional list or table, or entered as part of a SQL query.

The invention described and claimed herein can be modified to work with various types of operators: this would typically include, but is not limited to Boolean, SQL, or other conventional logical operations, such as fuzzy logic, phonetic comparisons or the soundex algorithm. Using such operations, simple single operations can be grouped into a series, thus forming a more complex or compound operation. This may be achieved, for example, by bracketing the appropriate simple operations to yield the compound operation.

Another aspect of this invention is demonstrated by the example in FIGS. 5b–5d. Here, the operator term has been fused with entries from the entry/result list in FIG. 5a. This yields what may be called a hybrid search term. Choosing one hybrid term, will result in an update of the hybrid term list as well as the planet result list. Thus, the implementation of hybrid terms simplifies the act of searching, by cutting down on the number of steps the user must perform. At the same time, this simplified search approach maintains the benefits of updating the list of relevant terms:

Although this invention has been described in terms of illustrative embodiments, it is clear that other embodiments which will be apparent to those with ordinary skill in the art are also within the scope of this invention. Accordingly, the scope of the invention is defined only by reference to the claims set forth herewith.

What is claimed is:

1. A method for displaying a progress and results of a database search until a desired result is displayed, said method comprising the steps of:
    a. displaying a set of entries from a database and a set of operators, wherein ones of said displayed set of entries and ones of said displayed set of operators are selected to form a database search query for producing valid results;
    b. selecting an initial entry of said displayed set of entries;
    c. displaying a set of valid results from a query based on said selected entry;
    d. updating said set of displayed operators based on said selected entry, wherein said updated set of displayed operators includes only operators from the set of operators, wherein the operators combined in a query with the selected entry and at least one of the set of entries from the database produce at least one valid result;
    e. selecting an operator from the updated displayed set of operators;
    f. updating said displayed set of entries in response to the selected operator, wherein said updated displayed set of entries includes only entries from the database, wherein the entries combined in a query with the selected entry and the selected operator produce at least one valid result;
    g. selecting one of said updated displayed set of entries;
    h. updating said displayed set of valid results according to a query based on the selected entries and the selected operator; and
    i. while said updated displayed set of valid results is not the desired result, repeating steps d. through h., based on all previously selected entries and operators, to select an additional operator and an additional entry for the database search query, and to update said displayed set of valid results.

2. The method of claim 1, wherein said displayed set of entries are displayed in at least one list, table or multi-dimensional field.

3. The method of claim 1, wherein the displayed set of entries can be displayed in any hierarchical order.

4. The method of claim 1, wherein said desired result corresponds to a non-nullity.

5. The method of claim 1, wherein said desired result corresponds to a nullity.

6. The method of claim 1, wherein the displayed set of entries is a subset of all entries of said database.

7. The method of claim 6, wherein entries of said database which bear no relevance for the database search are not contained in said displayed set of entries.

8. The method of claim 1, wherein the selections are made by a computer mouse-clicking mechanism and wherein the operators are Boolean operators.

9. The method of claim 1, wherein the selections are entered in a search command structured as a logical structured query such as a SQL query.

10. The method of claim 1, wherein the operators comprise at least one of a group consisting of fuzzy logic, phonetic comparisons, mathematical comparisons and other logical operators.

11. The method of claim 10, wherein a logical operator comprises a plurality of nested or combined single operators.

12. The method of claim 1, wherein the database entries are represented by words, text or numbers.

13. The method of claim 1, wherein the database entries are represented by pictures, photos, drawings, designs, or other visual characterizations of a particular content.

14. The method of claim 1, wherein the database entries are represented by video or audio segments.

15. The method of claim 1, wherein a the selected entries and the selected operators are used to form at least one hybrid search term.

16. The method of claim 1, wherein the progress and results of the database search are being displayed on a computer display.

17. A method for displaying a start, progress, and end-results of an operation to enhance a probability of obtaining a desired result, said method comprising the steps of:
    a. displaying a set of operands, a set of operators, and a result obtained from a selection of at least one of the displayed set of operands;
    b. selecting an initial operand of said displayed set of operands;
    c. updating said displayed result based on said selected operand;
    d. updating said set of displayed operators based on said selected operand, wherein said updated set of displayed operators includes only operators from the set of operators, wherein the operators combined with the selected operand and at least one of the set of operands produce at least one updated result;

e. selecting an operator from the updated displayed set of operators;

f. updating said displayed set of operands in response to the selected operator, wherein said updated displayed set of operands includes only operands from the database of operands, wherein the operands combined with the selected operand and the selected operator produce at least one updated result;

g. selecting one of said updated displayed set of operands;

h. updating said displayed result based on said selected operands and the selected operator; and i. while the updated displayed result is not the desired result, repeating steps d. through h., based on all previously selected operands and operators, to select an additional operator and an additional operand for the database search, and for updating said displayed result.

18. The method according to claim 1 or 17, wherein said method is directed by a computer program product;

said computer program product comprising a computer readable medium having thereon a computer code means, wherein the computer code means is loaded by a computer and directs the computer to execute a procedure to display information on a computer display; and wherein said procedure being executed is based on entered or chosen search terms, search commands, operators or operands.

19. The method according to claim 1 or 17, wherein said method is directed by a computer program element stored in a computer readable medium;

said program element comprising a computer code means, wherein the computer code means is loaded by a computer and directs the computer to execute a procedure to display information on a computer display; and wherein said execution of said procedure is based on entered or chosen search terms, search commands, operators or operands.

20. The method according to claim 1 or 17, wherein said method is directed by a computer readable medium;

said computer readable medium having a computer program recorded thereon, wherein the computer program is loaded by a computer and directs the computer to execute a procedure to display information on a computer display; and wherein said execution of said procedure being based on entered or chosen search terms, search commands, operators or operands.

21. A method for displaying a progress and results of a database search until a desired result is displayed, said method comprising the steps of:

a. displaying a set of entries from a database and a set of operators, wherein ones of said displayed set of entries and ones of said set of displayed operators are selected to form a database search query for producing a result;

b. selecting an initial entry of said displayed set of entries;

c. displaying at least one valid result based on said selected entry;

d. updating said set of displayed operators based on said selected entry, wherein said updated set of displayed operators includes only operators from the set of operators producing at least one valid result when the operators are selected with the selected entry and an additional entry from the set of entries;

e. selecting an operator from the updated displayed set of operators;

f. updating said displayed set of entries in response to the selected operator, wherein said updated displayed set of entries includes only entries from the database of entries, wherein the entries combined with the selected entry and the selected operator produce at least one valid result;

g. selecting one of said updated displayed set of entries; and h. updating said at least one displayed valid result based on the selected entries and the selected operator, wherein said database search is completed when the at least one updated displayed result is the desired result, or steps d. through h. are repeated until the at least one updated displayed result is the desired result.

22. A method for displaying a progress and results of a database search until a desired result is achieved, said method comprising the steps of:

a. supplying a set of entries from a database and a set of operators, wherein ones of said supplied set of entries and ones of said supplied set of operators are selected to form a database search query for producing valid results;

b. selecting an initial entry of said set of entries;

c. supplying a set of valid results from a query based on said selected entry;

d. updating said supplied set of operators based on said selected entry, wherein said updated supplied set of operators includes only operators from the set of operators, wherein the operators combined in a query with the selected entry and at least one of the set of entries from the database produce at least one valid result;

e. selecting an operator from the updated supplied set of operators;

f. updating said supplied set of entries in response to the selected operator, wherein said updated supplied set of entries includes only entries from the database, wherein the entries combined in a query with the selected entry and the selected operator produce at least one valid result;

g. selecting one of said updated supplied set of entries;

h. updating said supplied set of valid results according to a query based on the selected entries and the selected operator; and i. while said updated supplied set of valid results is not the desired result, repeating steps d. through h. based on all previously selected entries and operators, to select an additional operator and an additional entry for the database search query, and to update said supplied set of valid results.

* * * * *